Dec. 3, 1929.     J. H. JACOBS     1,737,764
COMBINED MICROMETER CALIPER AND DEPTH GAUGE.
Filed Nov. 5, 1928

Inventor
Joseph H. Jacobs.
By
Attorney

Patented Dec. 3, 1929

1,737,764

UNITED STATES PATENT OFFICE

JOSEPH H. JACOBS, OF ROCHESTER, NEW YORK

COMBINED MICROMETER CALIPER AND DEPTH GAUGE

Application filed November 5, 1928. Serial No. 317,306.

This invention relates to improvements in combined micrometer calipers and depth gauges.

In machine work it is frequently necessary to determine the exact exterior dimensions of work and also to determine the depth of grooves and other surfaces that are located below the principal surface of the article that is being worked upon. For the purpose of determining the outside diameter. it is customary to employ a micrometer caliper. Such calipers are widely used and their construction is well understood. For the purpose of measuring depth, gauges known as depth gauges are employed. These gauges are constructed on the micrometer principle and operate in the same general way.

It is the object of this invention to produce a micrometer caliper of such construction that it can be used as a depth gauge as well as for the purpose of obtaining outside dimensions.

This invention, briefly described, comprises a structure that in general appearance resembles an ordinary micrometer caliper, but which is modified to this extent that the anvil is provided with an opening through which an extension to the stem can pass and the stem is provided with an axial opening into which a part of the extension can be inserted. The caliper is provided with a removable base that can be put in place when the device is to be used as a depth gauge, but which can readily be removed when the device is to be used as an ordinary caliper.

Having thus briefly described the invention the same will now be described in detail and for this purpose reference will be had to the accompanying drawing in which the preferred embodiment of the invention has been shown and in which.

Figure 1:
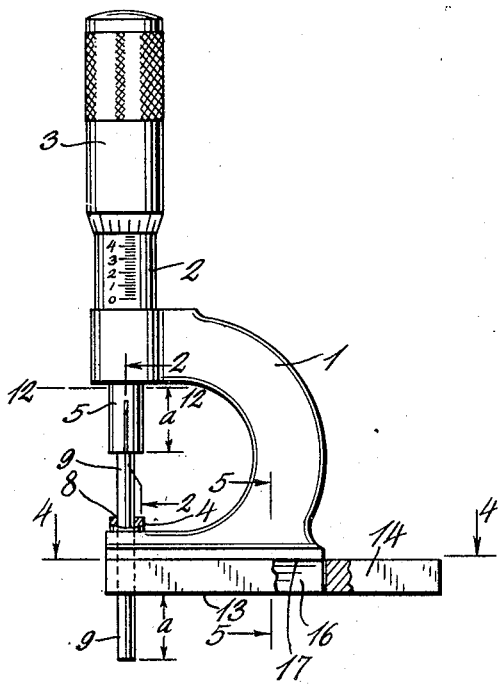
Fig. 1 is a side elevation of my improved tool showing the same arranged for measuring depth, a portion of the removable base being broken away.
Figure 2:
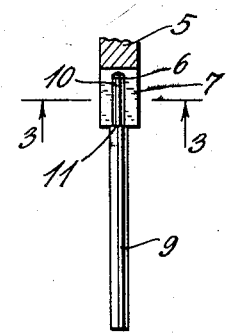
Fig. 2 is a section taken on line 2—2, Fig. 1.
Figure 3:
Fig. 3 is a section taken on line 3—3, Fig. 2.
Figure 4:
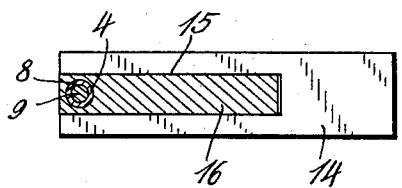
Fig. 4 is a section taken on line 4—4, Fig 1.

In the drawing numeral 1 designates the frame of a micrometer caliper, 2 the barrel, 3 the thimble, 4 the anvil and 5 the stem. The thimble and barrel are provided with the usual graduations and scales for obtaining vernier readings. The stem 5 has its end provided with an axial opening 6 and a diametrical cut 7 and the anvil 4 has an opening 8 whose axis coincides with the axis of the stem 5. An extension stem 9 has one end provided with an axial extension 10 of the same diameter as opening 6 and which is adapted to be inserted into the latter in the manner shown in Fig. 2. Since the projection 10 is of smaller diameter than the extension 9, a shoulder 11 is formed at the juncture of the two and this determines the extent to which the projection 10 may be inserted. When the micrometer is open, exactly one inch, the end of the stem 5 lies in plane 12—12 and the end of the extension is flush with the bottom 13 of the base, the distance from plane 12—12 to the end of the stem 5 is therefore always equal to the distance from the end of the extension 9 to the plane of bottom 13, and these distances have been designated by the letter $a$.

Figure 5:
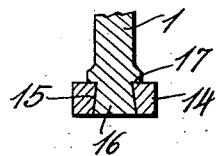
Fig. 5 is a section taken on line 5—5, Fig. 1.

When the tool is to be used as depth gauge, it is desirable to have a base of considerable area, but when it is used as an ordinary caliper, this is not necessary and I have therefore provided a removable base 14 that consists of a rectangular piece of steel having an opening 15 extending inwardly from one end. The inner sides of this opening are inclined in the manner shown in Fig. 5 and the caliper frame has a dovetail portion 16 that fits the slot or opening 15. Overhanging shoulders 17 form guides for the removable base. When the base is in place it forms an extension to the frame which makes it possible to support the same steadily on a surface. The base can be quickly removed and replaced by a simple sliding movement. As the extension 9 makes a right angle with the base, it is also possible to utilize the tool as a square. The tool may be provided with a plurality of extensions 9 that differ in length by an inch so that depths greater than an inch may be measured. When the tool is to be used as an ordinary caliper, the extension 9 may be removed.

From the above description it will be apparent that by the simple expedient of providing a micrometer caliper with a base lying in a plane at right angles to the axis of the stem and providing the stem with a removable extension, that projects through a hole in the anvil, it is possible to employ the same tool for a depth gauge as well as for measuring the outside diameter of objects and for determining right angles.

Having described the invention what is claimed as new is:

A combined micrometer caliper and depth gauge comprising a frame of substantially C-shape, an anvil carried by one end of the frame, a longitudinally movable stem secured to the other end of the frame, micrometer screw means for moving the stem towards and away from the anvil, said anvil having an opening in axial alignment with the stem, but of small diameter than the stem, a removable extension secured to the stem, said extension extending through the opening in the anvil, the frame having a supporting surface that lies in a plane perpendicular to the axis of the stem and a removable base extension secured to the frame, said extension comprising a metal bar having an elongated opening adapted to engage a cooperating tongue on the frame.

In testimony whereof I affix my signature.

JOSEPH H. JACOBS.